United States Patent
Wagner et al.

(10) Patent No.: US 6,244,670 B1
(45) Date of Patent: Jun. 12, 2001

(54) METHOD FOR CONTROLLING A HYDRAULIC BRAKING SYSTEM IN OPEN LOOP

(75) Inventors: Jochen Wagner, Moeglingen; Stefan Bayer, Ditzingen; Thomas Toelge, Munich, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/335,603

(22) Filed: Jun. 18, 1999

(30) Foreign Application Priority Data

Jun. 20, 1998 (DE) .............................. 198 27 584

(51) Int. Cl.$^7$ ...................................... B60T 8/32
(52) U.S. Cl. .................... 303/113.4; 303/113.2; 303/116.4
(58) Field of Search ................... 303/102, 113, 303/113.4, 115 A, 116.1, 116.2, 155

(56) References Cited

U.S. PATENT DOCUMENTS

| | | | | |
|---|---|---|---|---|
| 5,401,083 | * | 3/1995 | Altmann et al. | 303/116.1 |
| 5,549,369 | | 8/1996 | Rump et al. | |
| 5,927,824 | * | 7/1999 | Pahl et al. | 303/116.1 |
| 6,030,055 | * | 2/2000 | Schubert | 303/113.4 |
| 6,086,167 | * | 7/2000 | Heckmann et al. | 303/155 |

FOREIGN PATENT DOCUMENTS

| | | |
|---|---|---|
| 43 25 940 | 12/1994 | (DE) . |
| 43 38 065 | 5/1995 | (DE) . |
| 195 41 601 | 5/1997 | (DE) . |
| 196 15 805 | 10/1997 | (DE) . |
| 2 283 792 | 11/1994 | (GB) . |
| 2 307 017 | 10/1996 | (GB) . |

* cited by examiner

Primary Examiner—Christopher P. Schwartz
(74) Attorney, Agent, or Firm—Kenyon & Kenyon

(57) ABSTRACT

A method and a device for the open-loop control of a vehicle hydraulic braking system having an anti-lock braking system, the vehicle having two axles to which wheels are attached and having wheel brakes that are coupled to a pedal-actuated master brake cylinder via hydraulic lines in which valve devices are provided. When the anti-lock system is triggered at at least one wheel of an axle, an active brake-pressure buildup is carried out at the wheel brakes of the other axle in order to attain a fully developed deceleration of the vehicle. The initial pressure between the master brake cylinder and the valve devices is used as the control criterion for the active brake-pressure buildup. In response to the fulfillment of a switch-off condition for the fully developed deceleration, the fully developed deceleration is switched off using a delay ramp.

9 Claims, 2 Drawing Sheets

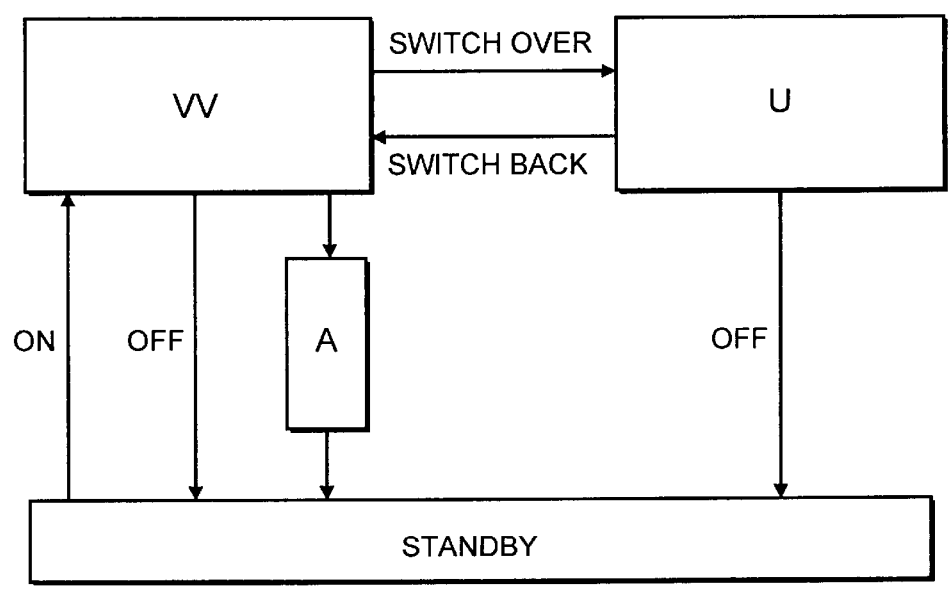
F I G. 2

METHOD FOR CONTROLLING A HYDRAULIC BRAKING SYSTEM IN OPEN LOOP

FIELD OF THE INVENTION

The present invention relates to a method for the open-loop control of a vehicle hydraulic braking system having an anti-lock system (ABS), the vehicle having two axles to which wheels are attached having wheel brakes that are coupled to a pedal-actuated master brake cylinder via hydraulic lines in which valve devices are provided. When the anti-lock system is triggered at at least one wheel of an axle, an active brake-pressure buildup is carried out at the wheel brakes of the other axle in order to attain a fully developed deceleration of the vehicle, the initial pressure between the master brake cylinder and the valve devices being used as the control criterion for the active brake-pressure buildup.

BACKGROUND INFORMATION

A previously proposed method is known, for example, from the German Published Patent Application No. 195 41 601. In response to a lock-up tendency occurring once at a front wheel, the method described therein provides for increasing the braking force at the rear axle above and beyond the specified driver input. The system pressure, determined with the aid of a sensor, is evaluated as a further criterion for the pressure buildup at the rear axle. The braking force at the rear axle should always be increased in particular when a situation has been recognized, according to which a driver demand for optimal utilization of the transferable braking force is probable. Such a situation is detected when the antilock protection controller has reduced the braking force at at least one front wheel. As soon as the driver releases the brake pedal, the brake pressure in the wheel brakes is reduced according to the driver's command.

German Published Patent Application No. 196 15 805 describes a method for controlling the braking system of a vehicle in open loop, with which, inter-alia, a maximum adhesion is adjusted during one control phase. Starting from a standby phase, there is a change into the control phase when various switch-on conditions are met. For example, the initial pressure adjusted by the driver is evaluated for this purpose. Implemented ABS interventions are not taken into consideration in this connection. As soon as a switch-off condition is met, there is a reversion from the control phase into the standby phase. For example, the initial pressure is evaluated in this connection, as well.

German Patent No. 43 38 065 describes a method for carrying out an automatic braking operation for motor vehicles having an anti-lock system. If the lock-up limit is reached at one wheel of the vehicle, an automatic braking process is carried out. During the automatic braking process, a braking pressure is produced which is greater than the braking pressure resulting from the position of the brake pedal. The braking pressure continues to be increased until, at each axle of the vehicle, the attainment of the lock-up limit for at least one wheel of the axle is determined by the anti-lock system.

German Patent No. 43 25 940 describes a method for determining a threshold value for the actuation speed of the brake pedal. If this threshold value is exceeded, an automatic braking process is triggered, during which a braking pressure is built up which is greater than the braking pressure resulting from the position of the brake pedal. The automatic braking process continuous until a discontinuation criterion is met.

The triggering of the automatic braking process by an ABS-controlled wheel can lead to an instability of the vehicle when the braking pressure at the other wheels is raised into the control range of the ABS. This is particularly the case on roadways having different road-surface coverings. In addition, irregularities in the roadway can lead to false triggerings. In response to the triggering of the support function, the driver can be irritated by the ABS function. The automatic braking process is first broken off with the release of the brake pedal. This means that a quite substantial force hysteresis occurs which holds the brake pedal forward.

SUMMARY OF THE INVENTION

An object of the present invention is to improve existing methods and devices for the open-loop control of the active pressure buildup in a hydraulic braking system. The particular intention is that the driver experience no disturbance due to an unwanted movement of the brake pedal in response to the switch-off of the fully developed deceleration.

Given a method for the open-loop control of a vehicle hydraulic braking system having an anti-lock system, the vehicle having two axles to which wheels are attached having wheel brakes that are coupled to a pedal-actuated master brake cylinder via hydraulic lines in which valve devices are provided. When the anti-lock system is triggered at at least one wheel of an axle, an active brake-pressure buildup is carried out at the wheel brakes of the other axle in order to attain a fully developed deceleration of the vehicle, the initial pressure between the master brake cylinder and the valve devices being used as the control criterion for the active brake-pressure buildup. The object of the present invention is achieved in that, in response to the fulfillment of a switch-off condition for the fully developed deceleration, the fully developed deceleration is advantageously switched off using a delay ramp. In this manner, abrupt switch-offs are avoided during which, given a pressure piling possibly still existing in the brake circuits, the brake pedal could strike unpleasantly against the driver's foot due to the sudden equalization of pressure. Another advantage of the delay function is that the brake pressure is reduced slowly.

The fully developed deceleration is advantageously reduced linearly within a predefined time to a predefined final value.

The initial pressure between the master brake cylinder and the valve devices is used as the control criterion for the active braking-pressure buildup. This has the advantage that a meaningful measured value, which is suitable as a control criterion, can be acquired in a simple manner using only one sensor. The initial pressure can be used both as a switch-on criterion, by which a fully developed deceleration is triggered, and as a switch-off criterion, by which the fully developed deceleration is switched off, and as a switchover criterion, with which a switchover from the fully developed deceleration to a smaller deceleration is carried out. In the last indicated case, it is particularly advantageous if the smaller deceleration is proportional to the initial pressure.

A fully developed deceleration of the vehicle is triggered in response to the fulfillment of a switch-on condition. The fully developed deceleration of the vehicle is effected by an active buildup of brake pressure. The pressure buildup in the wheel-brake cylinders which is not attributable to the braking force of the driver is designated as the active braking-pressure buildup. An active braking-pressure buildup is particularly necessary in situations in which the braking force of the driver only extends to an ABS control of the wheels of one axle. With the beginning of the closed-loop ABS control, the braking force is also frequently no longer increased by the driver as soon as one axle becomes ABS-controlled. However, a fully developed deceleration of the vehicle can only be achieved by an ABS control at all four wheels.

One particular specific embodiment of the present invention is characterized in that at least one of the following is used as a switch-on condition for the fully developed deceleration:

a) The anti-lock braking system is functioning faultlessly. For safety, the operation of the valve devices and the return pumps of the anti-lock system is monitored.

b) A pressure sensor for detecting the initial pressure has been successfully tested. The test of the pressure sensor is used to prevent an unwanted full braking because of a defective sensor.

c) The vehicle is not traveling in reverse. The speeds normally reached in reverse gear are not so high that an active pressure buildup is necessary.

d) The speed exceeds a predefined minimum speed.

e) The initial pressure exceeds a predefined minimum initial pressure. The check test of this switch-on condition provides the advantage that no fully developed deceleration of the vehicle is carried out when the driver steps only lightly on the brake pedal, although the anti-lock braking system is triggered at at least one wheel of an axle.

f) The anti-lock braking system was not triggered at all wheels of the vehicle. The check test of this switch-on condition gives the advantage that no active pressure buildup is carried out when the anti-lock system is already controlling all the wheels.

g) The longitudinal deceleration of the vehicle is greater than a predefined minimum deceleration. The predefined minimum deceleration can have a different value for an active pressure buildup at the rear axle than for an active pressure buildup at the front axle. The advantage of checking this switch-on condition is that false triggering, e.g., due to irregularities in the roadway or downshifting, are avoided. In the same way, no fully developed deceleration of the vehicle is initiated in response to a sudden occurrence of aquaplaning.

Another special type of embodiment of the present invention is characterized in that at least one of the following is used as a switch-off condition for the fully developed deceleration:

a) The speed of the vehicle is less than a predefined minimum speed. It is assumed that a fully developed deceleration of the vehicle is not necessary at a lower speed.

b) The filtered initial pressure is less than a predefined minimum value for the filtered initial pressure. By filtering the initial pressure, pressure peaks are eliminated, i.e., the functioning of the initial-pressure characteristic is smoothed out. Checking this switch-off condition provides the advantage that the implementation of a fully developed deceleration of the vehicle is ended when the driver reduces the braking force slowly.

c) The unfiltered initial pressure, during several cycles with falling tendency, is less than a predefined minimum value for the unfiltered initial pressure. The check test of this switch-off condition gives the advantage that the fully developed deceleration of the vehicle is ended when the braking force of the driver is reduced quickly. For safety reasons, the fully developed deceleration of the vehicle is only ended when the switch-off condition is met in several, e.g. 3, monitoring cycles.

d) The activity of the anti-lock braking system is ended at the at least one wheel of the one axle. Checking this switch-off condition serves to prevent a false switch-off of the active pressure buildup.

e) The initial pressure is greater than the maintained maximum wheel-brake pressure plus a safety constant. The advantage of checking this switch-off condition is that the active pressure buildup is ended when the driver brakes so strongly that his braking force is sufficient to bring about a closed-loop ABS control at all the wheels. For example, the safety constant can have a value of three bar.

f) The pre-charging pump is in operation and the initial-pressure gradient <0.

A further special type of embodiment of the present invention is characterized in that the fully developed deceleration is switched off without a delay ramp when the unfiltered initial pressure is less than a predefined minimum pressure. When the unfiltered initial pressure is less than the predefined minimum pressure, or a switching signal (e.g., from the brake lights switch) is generated which indicates the release of the brake pedal, this means that the driver has removed his foot from the brake pedal. In this case, a quick termination of the fully developed deceleration of the vehicle without a delay function is desirable.

Another special embodiment of the present invention is characterized in that a switchover from the fully developed deceleration to a smaller deceleration is effected when the initial pressure decreases. This ensures that the fully developed deceleration of the vehicle is ended when the brake force of the driver decreases.

A further special type of embodiment of the present invention is characterized in that the smaller deceleration is proportional to the initial pressure. When the switchover condition is met, a setpoint deceleration is predefined which is proportional to the braking force of the driver. Initially, the setpoint deceleration is equal to the actual deceleration. A suppression function, which continually reduces the setpoint deceleration to zero within a specific time, can be superimposed on the setpoint-deceleration formation. In this manner, it is possible to force a transition to a passive (normal) braking.

The above-indicated objective is achieved in a device for implementing the already described method, in that an initial-pressure sensor is arranged between the master brake cylinder and the valve devices. The initial-pressure sensor is used to detect the braking force of the driver.

BRIEF DESCRIPTION OF THE DRAWINGS

FIG. 2 shows a diagram in which the phases of the open-loop control method according to the present invention are represented.

DETAILED DESCRIPTION

Figure 1:
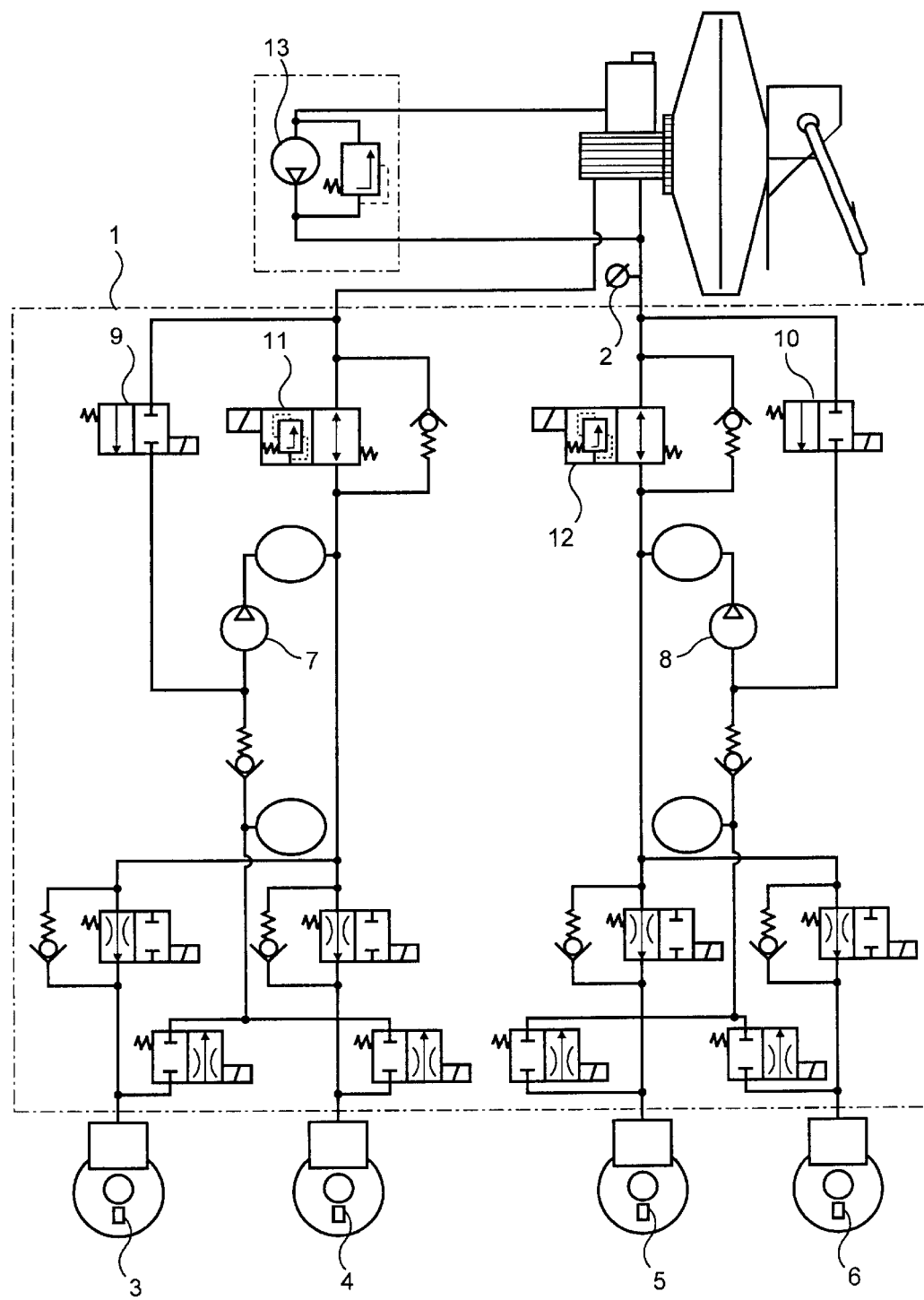
FIG. 1 shows a circuit diagram of a hydraulic braking system.

The hydraulic braking system shown in FIG. 1 includes a hydraulic aggregate 1 as is described illustratively in German Published Patent Application No. 195 41 601. With this means, an active pressure buildup is possible in each brake circuit and therefore at each axle. A pressure sensor 2 is used to detect the initial pressure, i.e., the braking force. The speed and the deceleration of the vehicle is ascertained using wheel-speed sensors 3, 4, 5, 6 of the anti-lock braking system. The active pressure buildup is effected by way of return pumps 7, 8 and optionally, a precharging pump 13 which is necessary for wheel-selective braking-control interventions for the case that no initial pressure is built up by the driver. Also included in the braking circuit concerned is a charging valve 9, 10 and a selector valve 11, 12.

FIG. 2 shows the various phases of the open-loop control method of the present invention. From a "standby phase", the control goes over into a "fully developed deceleration phase" VV when all switch-on conditions are met. The switch-on conditions are as follows:

1. ABS functioning faultlessly;
2. pressure-sensor test has been carried out;
3. no reverse travel;
4. speed>minimum speed;
5. initial pressure>minimum initial pressure;
6. not all wheels in ABS control;
7. deceleration greater than minimum deceleration;
8. ABS control front left and/or front right.

Every twenty milliseconds, it is checked whether each of the switch-on conditions is met. If this is the case, a fully developed deceleration VV is triggered. As described above, in the present case the fully developed deceleration VV is carried out by an active pressure buildup in the wheel-brake cylinders at the rear axle.

As indicated by an arrow OFF in FIG. 2, fully developed deceleration VV is directly switched off when the initial pressure suddenly drops below a predefined minimum pressure. This means that the driver has quickly removed his foot from the brake pedal. However, this could also be recognized through the switching signal of a "brake lights switch".

When the initial pressure is greater than the predefined minimum pressure, the open-loop control goes over into a switch-off phase A when one of the following switch-off conditions is met:

1. the speed is<a minimum speed;
2. the filtered initial pressure is<a minimum pressure;
3. the unfiltered initial pressure, 3 cycles with falling tendency, is<a minimum pressure;
4. the return pump is in operation and the initial pressure gradient is <0;
5. no ABS control at the front axle;
6. the initial pressure is greater than the maintained maximum wheel-brake pressure plus a safety constant.

When one of these six switch-off conditions is met, there is a changeover from fully developed deceleration VV into a switch-off phase A. For example, switch-off condition No. 6 is met when the braking force of the driver increases to the extent that an active pressure buildup is no longer necessary. This is the case when the braking force of the driver is sufficient to keep all four wheels in the ABS control.

During the switch-off phase A, fully developed deceleration VV is not ended abruptly, but rather is reduced linearly within a predefined time to a predefined final value. During an abrupt switch-off, given a pressure piling possibly still existing in the brake circuits, the brake pedal could strike unpleasantly against the driver's foot due to the sudden equalization of pressure. Therefore, the switch-off is to be provided with a delay ramp.

When the initial pressure is only reduced by a small value which is still not sufficient to meet one of the switch-off conditions, there is a switchover into a transition phase Ü. In this transition phase Ü, a fully developed deceleration is no longer carried out, but rather a smaller deceleration which is proportional to the initial pressure. The proportionality factor is calculated at the beginning of the transition phase in such a way that with the instantaneous initial pressure, the setpoint deceleration assumes the value of the prevailing actual deceleration. In this manner, a steady continuation results in the characteristic of the vehicle deceleration.

In addition, superimposed on the setpoint deceleration formation is a suppression function which continuously reduces the setpoint deceleration to zero within a specific time. This forces a transition to a normal braking.

When the setpoint deceleration has been reduced to zero, there is a shift again into the standby phase.

Alternatively, it is possible to use factor curves in transition phase Üwhich, for example, restrict or completely eliminate the active pressure buildup as a function of the vehicle transverse acceleration. In the same way, sharply differing ABS-control pressure levels between the left and the right wheel can lead to reducing or ending the active pressure buildup.

Due to the active brake-pressure buildup, the braking distance during brakings, in which the braking force of the driver is only sufficient to bring the wheels of one axle into a closed-loop ABS control, is shortened. This can be the case when, for example, given a loaded vehicle, the ABS-control pressure at the rear axle is perceptively above that at the front axle. Through the switch-on-, switchover- and switch-off conditions, the functioning appears like a normal ABS control for the driver, which he himself initiates and comparably interrupts again, as well.

What is claimed is:

1. A method for a control of a vehicle hydraulic braking system of a vehicle having an anti-lock braking system, the vehicle including a plurality of axles to which a plurality of wheels are attached and including a plurality of wheel brakes coupled to a pedal-actuated master brake cylinder via hydraulic lines in which valve devices are provided, the method comprising the steps of:

when the anti-lock braking system is triggered at at least one of the plurality of wheels of one of the plurality of axles, causing an active brake-pressure buildup at the plurality of wheel brakes of another one of the plurality of axles in order to attain a fully developed deceleration of the vehicle; and switching off the fully developed deceleration by using a delay ramp in response to a fulfillment of a switch-off condition for the fully developed deceleration wherein an initial pressure between the pedal-actuated master brake cylinder and the valve devices is used as a control criterion for the active brake-pressure buildup.

2. The method according to claim 1, further comprising the step of:

linearly reducing the fully developed deceleration within a predefined time to a predefined final value.

3. The method according to claim 1, further comprising the step of:

performing one the following steps:
using the initial pressure as a switch-on criterion with which the fully developed deceleration is triggered,
using the initial pressure as a switch-off criterion with which the fully developed deceleration is switched off, and
using the initial pressure as a switchover criterion with which a switchover is effected from the fully developed deceleration to a smaller deceleration which is proportional to the initial pressure.

4. The method according to claim 1, further comprising the step of:

using at least one of the following conditions as a switch-on condition for the fully developed deceleration:
the anti-lock braking system is operating faultlessly,
a pressure sensor for detecting the initial pressure has been successfully tested,
the vehicle is not driving in reverse,
a speed of the vehicle exceeds a predefined minimum speed,
the initial pressure exceeds a predefined minimum initial pressure,
the anti-lock braking system was not triggered at all of the plurality of wheels of the vehicle,
a longitudinal deceleration of the vehicle is greater than a predefined minimum deceleration, and
an anti-lock control is provided for at least one of a front left wheel brake and a front right wheel brake of the plurality of wheel brakes.

5. The method according to claim 1, further comprising the step of:

using at least one of the following conditions as a switch-off condition for the fully developed deceleration:
a speed of the vehicle is less than a predefined minimum speed,
a filtered initial pressure is less than a predefined minimum value for the filtered initial pressure,
an unfiltered initial pressure, during several cycles with a falling tendency, is less than a predefined minimum value for the unfiltered initial pressure,
an activity of the anti-lock braking system is ended at at least one wheel of one of the plurality of axles acting as a triggering axle,
the initial pressure is greater than a maintained maximum wheel-brake pressure plus a safety constant, and
a precharging pump is in operation and an initial pressure gradient is less than 0.

6. The method according to claim 1, further comprising the step of:

switching off the fully developed deceleration without the delay ramp when one of the following conditions occurs:
an unfiltered initial pressure is less than a predefined minimum pressure, and
a switching signal is generated which indicates a release of a brake pedal of the vehicle.

7. The method according to claim 3, wherein the switchover criterion is fulfilled when the initial pressure decreases.

8. A device for a control of a vehicle hydraulic braking system of a vehicle having an anti-lock braking system, the vehicle including a plurality of axles to which a plurality of wheels are attached and including a plurality of wheel brakes coupled to a pedal-actuated master brake cylinder via hydraulic lines in which valve devices are provided, comprising:

an arrangement for causing an active brake-pressure buildup at the plurality of wheel brakes of another one of the plurality of axles in order to attain a fully developed deceleration of the vehicle, when the anti-lock braking system is triggered at at least one of the plurality of wheels of one of the plurality of axles, wherein the arrangement for causing the active brake-pressure buildup includes an arrangement for using an initial pressure between the pedal-actuated master brake cylinder and the valve devices as a control criterion for the active brake-pressure buildup; and an arrangement for switching off the-fully developed deceleration by using a delay ramp, in response to a fulfillment of a switch-off condition for the fully developed deceleration.

9. The device according to claim 8, further comprising:

a pressure sensor arranged between the pedal-actuated master brake cylinder and the valve devices.

* * * * *